US010854020B2

(12) United States Patent
Galli et al.

(10) Patent No.: US 10,854,020 B2
(45) Date of Patent: Dec. 1, 2020

(54) TRANSPONDER MODULE FOR DETERMINATION OF A CROSSING TIME IN A MEASURING SYSTEM

(71) Applicant: Swiss Timing Ltd, Corgemont (CH)

(72) Inventors: Reto Galli, Muenchenbuchsee (CH); Frederic Choffat, Alle (CH); Andre Zanetta, Wavre (CH); Nikias Klohr, Stutensee (DE)

(73) Assignee: Swiss Timing Ltd, Corgemont (CH)

( * ) Notice: Subject to any disclaimer, the term of this patent is extended or adjusted under 35 U.S.C. 154(b) by 401 days.

(21) Appl. No.: 15/790,165

(22) Filed: Oct. 23, 2017

(65) Prior Publication Data

US 2018/0122159 A1    May 3, 2018

(30) Foreign Application Priority Data

Nov. 1, 2016 (EP) .................................... 16196722

(51) Int. Cl.
  *G07C 1/24* (2006.01)
  *G07C 1/22* (2006.01)
  (Continued)

(52) U.S. Cl.
  CPC .................. *G07C 1/24* (2013.01); *G04F 8/08* (2013.01); *G05B 15/02* (2013.01); *G07C 1/22* (2013.01); *G07C 9/00309* (2013.01); *A63B 71/06* (2013.01)

(58) Field of Classification Search
  CPC ........ G07C 1/22; G07C 1/24; G07C 9/00309; A63B 71/06; G04F 8/08; G05B 15/02
  See application file for complete search history.

(56) References Cited

U.S. PATENT DOCUMENTS

| 4,893,318 A * | 1/1990 | Potash ................. H04J 3/0682 375/358 |
| 8,553,743 B1 * | 10/2013 | Nichols ................. H04B 1/715 375/130 |

(Continued)

FOREIGN PATENT DOCUMENTS

| EP | 2 747 036 A1 | 6/2014 |
| EP | 3 073 447 A1 | 9/2016 |
| WO | WO 98/06184 A1 | 2/1998 |

OTHER PUBLICATIONS

European Search Report dated Apr. 19, 2017 in European Application 16196722.9, filed on Nov. 1, 2016 (with English Translation of Categories of cited documents).

(Continued)

*Primary Examiner* — Kyle R Quigley
(74) *Attorney, Agent, or Firm* — Oblon, McClelland, Maier & Neustadt, L.L.P.

(57) ABSTRACT

A transponder module of a system for measurement of a race time includes a time base in a microcontroller, which is activated upon receipt of a low-frequency electromagnetic field signal from a transmission antenna of a measuring system which is disposed at the level of a line of passage. The microcontroller, once woken up, is capable of measuring several successive intensities of the captured electromagnetic field in order to reconstruct a curve of the electromagnetic field and to determine a crossing time on the line of passage of the transponder module with the activated time base thereof in order to transmit, to a decoder unit of the measuring system, a signal of the result of the time of crossing determined by the microcontroller.

11 Claims, 3 Drawing Sheets

(51) Int. Cl.
*G07C 9/00* (2020.01)
*G04F 8/08* (2006.01)
*G05B 15/02* (2006.01)
*A63B 71/06* (2006.01)

(56) References Cited

U.S. PATENT DOCUMENTS

| | | | |
|---|---|---|---|
| 2005/0033947 A1* | 2/2005 | Morris | G06F 1/14 |
| | | | 713/1 |
| 2009/0109971 A1* | 4/2009 | Rozen | H04L 1/1874 |
| | | | 370/389 |
| 2013/0300542 A1* | 11/2013 | Hansen | G07C 1/24 |
| | | | 340/10.1 |
| 2014/0169140 A1* | 6/2014 | Bisig | G07C 1/22 |
| | | | 368/2 |
| 2016/0279500 A1 | 9/2016 | Zanetta et al. | |
| 2017/0195980 A1* | 7/2017 | Aggarwal | H04W 56/007 |

OTHER PUBLICATIONS

Canadian Office Action dated Aug. 18, 2020, in corresponding Application No. 2,982,980, filed on Oct. 18, 2017.

\* cited by examiner

TRANSPONDER MODULE FOR DETERMINATION OF A CROSSING TIME IN A MEASURING SYSTEM

This application claims priority from European patent application No. 16196722.9 filed on Nov. 1, 2016, the entire disclosure of which is hereby incorporated herein by reference.

FIELD OF THE INVENTION

The invention relates to a transponder module for determination of a crossing time on a line of passage for a sports competition in a system for measurement of a crossing time.

The invention relates likewise to a system for measurement or determination of at least one crossing time, which comprises at least one transponder module carried by a moving object.

The invention likewise relates to the method for determination of a crossing time for activating the transponder module of the measuring system.

BACKGROUND OF THE INVENTION

For determination of a crossing time, several timing systems are known using several active transponder modules and each worn by a respective competitor. These timing systems generally use an antenna disposed on the ground near a line of passage, such as a finish line, and transmit a low-frequency signal, such as a frequency of the order of 125 kHz. This low-frequency signal makes it possible to wake up each transponder module approaching a certain distance from the line of passage. Once the transporter module is woken up, two different implementations of the timing system are known, which are described in summary hereafter.

According to a first implementation, the woken-up transponder module uses a high-frequency communication, for example of the order of 6.8 MHz, in order to communicate with a base station of the timing system. It transmits messages which in particular contain the identification code thereof and several other items of information in a variable time interval according to the Aloha protocol. This Aloha protocol has been well known in the technical field since the 1970s and is described on the internet site https://en.wikipedia.org/wiki/ALOHAnet. It makes it possible for a plurality of transponder modules to transmit information on the same communication channel, but at random intervals.

At the level of a line of passage for measurement of a time, an antenna is provided on the ground or at the sides, which can receive in particular the identification code message of the transponder module. This antenna on the ground or at the sides can be the same antenna used in order to waken up the transponder module. Upon receipt of the message by the antenna on the ground or at the sides, a decoder is connected to the antenna. This decoder assigns a temporal stamp to the received message and likewise measures the RSSI force of the received signal. This force of the captured signal follows a typical or theoretical curve as represented in FIG. 3. Thus the curve depends upon the orientation of the transponder module and upon the receiving antenna, taking into account the three measurement axes. On the basis of this curve, the decoder can determine the exact crossing time of the competitor with his transponder module by using a specific algorithm dedicated to a sports competition. Such an implementation is described in particular in the patent applications US 2006/0097847 A1 and WO 02/21141 A1.

According to a second implementation, the woken-up transponder module measures the force of the magnetic field of the low-frequency signal transmitted by the antenna on the ground or at the sides, which is the antenna for waking up the transponder module. Measurements of the force of the magnetic field are effected along one or more directions at regular intervals. The results of the measurements are sent by the transponder module using an ultrahigh-frequency UHF communication, for example at 868 MHz or 915 MHz. These measurement results are received by a second antenna of a decoder. One or more measurement points can be contained in the UHF signal of data transmitted by the transponder module. Likewise, there can be redundant information in the transmitted UHF signal.

Upon receipt of the UHF data signal, the decoder assigns a precise temporal stamp to the received message. As described above with reference to FIG. 3 with the transponder module crossing near to or over the antenna on the ground, the force of the magnetic field measured by the transponder module follows a typical or theoretical curve. The force of the measured field depends upon the orientation of the transponder module, and also upon the transmitting antenna. On the basis of this curve, the decoder can determine the exact crossing time on the line of passage using a specific algorithm dedicated to a sports competition. Such an implementation is described in particular in the patent EP 1 447 681 B1 and the patent application CH 707 401 A2.

In order to obtain high precision in detection of the crossing time, a large number of data points must be supplied to the decoder. Thus, several measurement messages must be sent from the transponder module to the decoder. This limits the number of transponder modules which can be processed in parallel. Furthermore, this increases the width of the radio band which is used in order to transmit all this information, which is disadvantageous.

If the messages are lost during the HF or UHF communication, the force curves of the field are incomplete and the algorithm can detect the crossing only with reduced precision.

The patent application JP 2002-228777 A describes a system for measurement of the time of a moving object, in particular for a horse, bicycle or car race. A magnetic field is generated by windings disposed under the ground of the racecourse at lines of passage in order to make it possible to obtain a crossing time on the basis of a peak value of the intensity of the magnetic field measured by a transponder module disposed on the moving object. Three magnetic sensors can be provided in the transponder module in order to measure the magnetic field along the three measurement axes. A time gap can also be defined by the detection of two peak values on two successive lines of passage. The measurement data of the peak value of the magnetic field are stored in the transponder module and can be transmitted upon finishing the race to a decoder in order to determine the intermediate times and a final time of the race of the moving object.

In this patent application JP 2002-228777 A, it is not provided to effect measurements of several points of the magnetic field in the transponder module and to reconstruct the curve of the magnetic field in order to determine precisely the crossing time in the transponder module. Furthermore, the transponder module does not transmit the result of the crossing time determined in particular on the finish line according to the Aloha protocol on a finishing decoder, which constitutes a disadvantage. Furthermore, the finish decoder is not in a position to process, in parallel, information from a large number of transponder modules crossing the line of passage at the same moment, which constitutes another disadvantage.

No system of the state of the art makes it possible to take into account the finishing time with precise and simple processing for a very large number of transponder modules which are to be identified separately and which are able, at the same moment in the race, to cross over the line of passage.

SUMMARY OF THE INVENTION

The aim of the invention is therefore to remedy the disadvantages of the state of the art, mentioned above, by proposing a transponder module disposed on a moving object of a system for measurement of a crossing time for precise determination of a crossing time on a line of passage.

To this end, the invention relates to a transponder module intended to be disposed on a moving object for determination of a crossing time on a line of passage for a sports competition of a measuring system, the system comprising at least one transmission unit for a low-frequency electromagnetic field signal via an antenna disposed at the level of the line of passage, and a decoder unit, in order at least to receive at least one measurement signal from the activated transponder module near the line of passage, the transponder module comprising a low-frequency signal receiver in order to receive the electromagnetic field signal via a receiving antenna in order to be woken up by this electromagnetic field signal, a microcontroller receiving a receiving signal from the receiver, at least one transmitter linked to the microcontroller for transmission via a high-frequency antenna of at least one measurement result in a high-frequency measurement signal, wherein the transponder module comprises a time base in the microcontroller, the time base being activated upon receiving the electromagnetic field signal, and wherein the microcontroller, once woken up, is capable of measuring several successive intensities of the captured electromagnetic field signal in order to reconstruct an electromagnetic field curve and to determine a crossing time of the transponder module by means of the activated time base thereof, in order to transmit, to the decoder unit of the measurement system, the result of the crossing time determined by the microcontroller.

Particular embodiments of the transponder module are defined in the dependent claims 2 to 8.

One advantage of the transponder module disposed on a moving object in a sports competition resides in the fact that, as the measurement of the crossing time is determined directly in the transponder module by reconstruction of the curve of the magnetic field on the basis of various measurement points, the quantity of data transmitted by the transponder module is greatly reduced. This likewise increases the number of transponder modules which can be processed in parallel by the decoder unit of the measuring system. For example, approximately a hundred activated transponder modules can be processed in parallel. Furthermore, this reduces the radio band width used for the communication.

Advantageously, transmission of the result of the measurement of the crossing time can be effected at regular intervals following receipt of the wake-up and synchronisation signal of the electromagnetic field, or at variable intervals according to the Aloha protocol.

Advantageously, loss of UHF messages during signal transmission from the transponder module does not reduce the determination precision of a race time of the measuring system. All the data points are still available for detection in the measuring system, given that it is the transponder module which determines the crossing time on the line of passage. This can be specially advantageous in difficult radio environments.

Advantageously, as the radio communication results in a large consumption of power in the transponder module which is greater than the actual calculation by the dedicated algorithm, the lifetime of the battery of the transponder module can be increased. This results from the fact that few data messages are transmitted by the transponder module to the decoder unit. Furthermore, the microprogram of the transponder module can be easily updated.

To this end, the invention likewise relates to a measuring system of at least one crossing time, which comprises at least one transponder module for determination of a crossing time on a line of passage, said transponder module being carried by a moving object, the system comprising at least one transmission unit of a low-frequency electromagnetic field signal via a transmission antenna disposed at the level of the line of passage and a decoder unit in order at least to receive at least one measurement signal from the activated transponder module near the line of passage, the transponder module comprising a low-frequency signal receiver in order to receive the electromagnetic field signal via a receiving antenna in order to be woken up by this electromagnetic field signal, a microcontroller receiving a receipt signal from the receiver, at least one transmitter linked to the microcontroller for the transmission via a high-frequency antenna of at least one measurement result in a high-frequency measurement signal, wherein each transponder module comprises a time base in the microcontroller, the time base being activated upon receipt of the electromagnetic field signal generated by the transmission antenna, wherein the microcontroller, once woken up, is capable of measuring several successive intensities of the captured electromagnetic field signal in order to reconstruct a curve of the electromagnetic field and to determine a crossing time of the transponder module by means of the activated time base thereof, in order to transmit, to the decoder unit of the measuring system, a signal of the result of the crossing time determined by the microcontroller, and wherein the decoder unit assigns a temporal stamp to the signal about the result of the crossing time received from the transponder module in order to determine the exact crossing time on the basis of a time base of the decoder unit of the measuring system.

Particular embodiments of the measuring system are defined in the dependent claims 10 to 15.

To this end, the invention relates also to a method for measurement of at least one crossing time in a measuring system, the measuring system comprising at least one transponder module for determination of a crossing time on a line of passage, the method comprising steps consisting of:

generating an electromagnetic field signal by a transmission unit of the measuring system, activating the personalised transponder module upon receipt of the electromagnetic field signal before crossing the line of passage, measuring several intensities of the electromagnetic field signal in the transponder module, once woken up, determining, by reconstruction of a curve of the electromagnetic field in the transponder module which comprises a time base activated upon wake-up of the transponder module, a crossing time of the transponder module on the line of passage, and transmitting, via the transponder module, a signal of the result of the determination of the crossing time to a decoder unit of the measuring system for processing of the signal result received from the transponder module and precise determination of the crossing time of the line of passage.

Particular steps of the method are defined in the dependent claims 17 to 20.

BRIEF DESCRIPTION OF THE DRAWINGS

The aims, advantages and features of the transponder module disposed on a moving object in an automated measuring system, the system and the method for determination of a crossing time for activating the transponder module according to the invention will appear more clearly in the following description of at least one embodiment which is non-limiting and illustrated by the drawings, in which.

DETAILED DESCRIPTION OF THE INVENTION

In the following description, all the elements of the measuring system and of the transponder module for determination of a crossing time on a line of passage, which are well known to the persons skilled in the art in this technical field, will be referred to only in a simplified manner.

Figure 1:
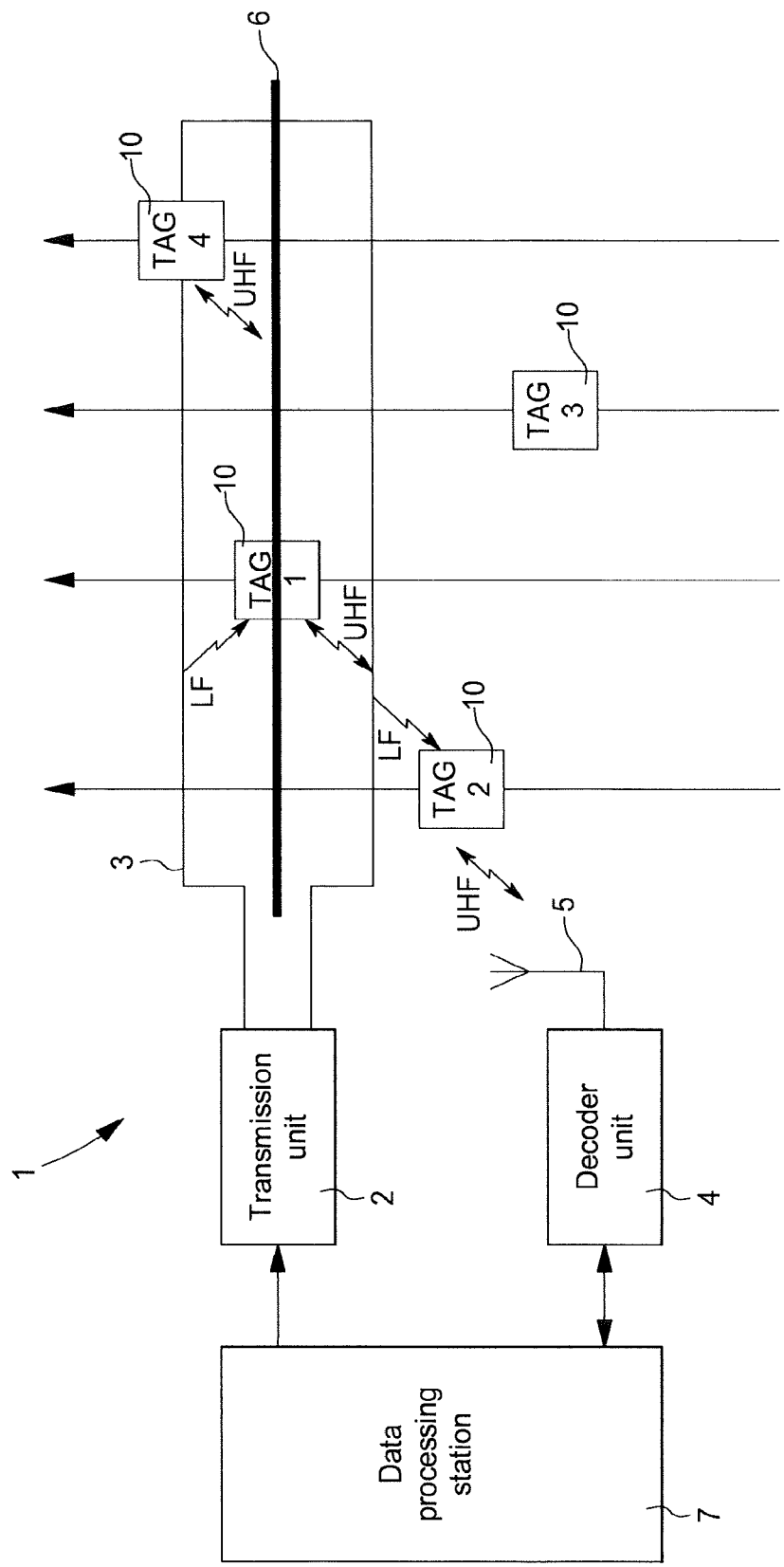
FIG. 1 represents schematically an automated measuring system, which comprises a plurality of transponder modules for implementing a method according to the invention for measurement of at least one crossing time on a line of passage in a sports competition.

FIG. 1 represents schematically an automated measuring system 1, which can be used in principle in any type of sports competition in order to determine a race time or likewise a crossing order of a moving object. This measuring system 1 can, for example, be used for an athletics competition, a cycle race, a horse race, a car race or any other sports competition. This moving object can be a competitor, a horse, a bicycle, a vehicle.

The measuring system 1 preferably includes at least one transmission unit 2 for generating a low-frequency signal LF, which is an electromagnetic field signal transmitted via a transmission antenna 3 disposed on the ground or on the side or sides of the line or above. It can also preferably be centred on a line of passage 6, which can be an intermediate line of passage or a finish line. The system likewise comprises one or more transponder modules 10, defined as TAG1, TAG2, TAG3, TAG4, each able to be disposed on a moving object, such as a competitor or a cycle or a car or a racehorse or other animal. Each transponder module 10 is personalised to the object on which it is placed. Finally the system includes a receiver unit or decoder unit 4 for receiving via a receiver antenna 5 UHF high-frequency signals transmitted by the activated transponder modules for determining a crossing time on a line of passage 6. Transmission unit 2 and decoder unit 4 are connected and controlled by a data-processing station 7.

It should be noted that the processing station 7 can be used for processing information from the decoder unit 4 and displaying the various times of the runners, horses or vehicles with their ranking. The decoder unit 4 can also be used for programming each transponder module 10, as explained hereafter, by transmission of a high-frequency signal with digital or GFSK modulation of data or commands. This FIG. 1 does not show a possible second antenna for effecting transmission to the transponder module. The signal transmitted by the decoder unit 4 can also be used to personalise said module, for example, to the respective runner. Furthermore, the UHF signal transmitted by the decoder unit 4 can also make it possible to deactivate each transponder module once the line of passage 6 has been crossed by said moving object with the transponder module.

Each transponder module 10 approaching the line of passage 6 can be woken up by the electromagnetic field signal, generally at low-frequency. Furthermore for synchronisation of the transponder module 10, it can be provided also to transmit an electromagnetic field signal with modulation of a synchronisation command from the antenna 3 of the transmission unit 2, following wake-up of the transponder module 10. The personalised transponder module 10 is preferably a transponder module of the active type, i.e. provided with a battery for electrical supply of the electronic components forming it. In principle, in order to be able to implement the dedicated algorithm for determination of the crossing time, the transponder module must be of the active type. However, in order to reduce the electrical consumption thereof, it is generally in a rest mode.

As represented in FIG. 1, the first transponder module TAG1 is located on the line of passage 6 which can be the finish line. It is woken up and possibly synchronised by the low-frequency signal LF modulated by the transmission antenna 3. The second transponder module TAG2 is located at a distance near the transmission antenna 3 and able to be woken up by the low-frequency signal LF. The third transponder module TAG3 is located at a distance far away from the transmission antenna 3. Hence, the third transponder module is not able to be woken up by the low-frequency signal LF and remains in a rest mode. The fourth transponder module TAG4 is shown having crossed the finish line and, in this case, it is able to receive a command from the decoder unit 4 to deactivate it and place it in a rest mode. However the fourth transponder module TAG4 can also be disconnected automatically after several repetitions of successive transmitted messages. This fourth transponder module TAG4 was able to determine the crossing time in the transponder module, as explained hereafter, by having provided the result to the decoder unit 4 for precise determination of the crossing time.

Figure 2:
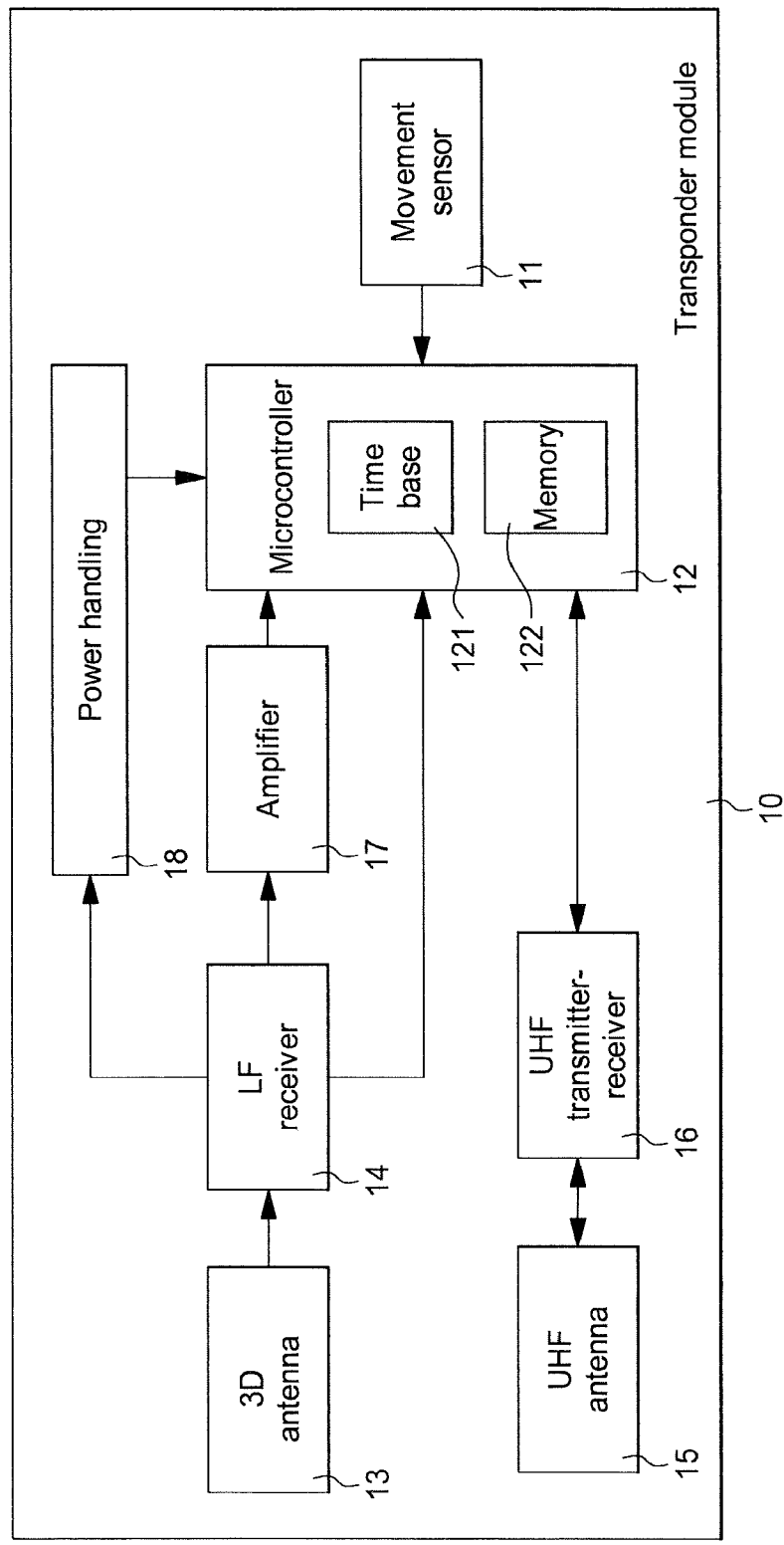
FIG. 2 represents an embodiment of a transponder module for determination of at least one crossing time on a line of passage according to the invention.

One embodiment of the transponder module 10, which can be used for any type of sports competition, is represented in FIG. 2. The transponder module 10 can comprise a signal receiver 14, such as low-frequency signals, in order to receive low-frequency signals, such as electromagnetic field signals, via an antenna 13. This reception antenna 13 can preferably be a triaxial antenna.

In order to reduce the electrical consumption of the transponder module, a power handling unit 18 can be provided. The battery can be part of this handling unit or be connected thereto. The power handling unit 18 makes it possible to control the electrical supply of the electronic components of the transponder module, normally upon receipt of a wake-up and possibly synchronisation command of a low-frequency signal transmitted by the antenna 3. This synchronisation can be obtained by a modulation, for example all or nothing.

The transponder module 10 also comprises a transmitter or a high-frequency transmitter-receiver 16 for transmission of UHF signals via an antenna 15 or a set of antennae with electromagnetic coupling of one or more information signals. These information signals are at a carrier frequency situated between 300 MHz and 3,000 MHz, or other frequencies outside this band of frequencies. The information signal or signals are transmitted upon command of a microcontroller 12 to the decoder unit 4 of the measuring system 1 of FIG. 1. The transponder module also comprises a time base 121 integrated in the microcontroller 12, which can be synchronised via the electromagnetic field signal LF which is modulated and captured. A memory 122 of the microcontroller 12 makes it possible to store all the measurements or forces of the electromagnetic field captured by the triaxial antenna 13.

The transponder module can also comprise a movement sensor 11, such as an accelerometer, in order to facilitate and improve determination of a race time. This movement sensor 11 is connected to the microcontroller 12. In the case of a sports competition, such as a cycle race on a track, the line of passage can comprise a strip of a certain thickness. The movement sensor of the transponder module disposed on the frame of the cycle can detect a steep variation in movement following impact of the cycle wheel on said crossing strip. Thus, it can provide information in a UHF signal transmitted by the transponder module 10.

The low-frequency signal receiver 14 of the transponder module 10 is connected to the microcontroller 12 and to the power handling unit 18. At the output, the receiver can also possibly be connected to an amplifier 17 which provides an amplified reception signal to the microcontroller 12 for measurement of the level of the field captured by the transponder module. This makes it possible to increase the measurement dynamics. Hence, it is possible to capture very small low-frequency signals or very strong low-frequency signals.

Once activated, the transponder module 10 can measure, via the triaxial antenna 13, one or more successive groups of intensity measurements of the captured electromagnetic field. It can measure various intensity points of the captured electromagnetic field. A group of intensity measurements comprises three measurements of the electromagnetic field along the axes X, Y, Z, captured by the triaxial antenna 13 at a given time once the time base 121 of the microcontroller 12 is activated and possibly synchronised. This time base 121 starts the count of the time once activated. Each group of intensity measurements of the electromagnetic field defines a data packet or a data point relating to each determined measurement time. These measurements according to the three measurement axes are generally defined by a circuit for indicating the force of the received signal. Each intensity measurement group which is obtained can be stored in the memory 122 of the microcontroller 12 in the transponder module 10. Preferably, two, three, four or more intensity measurement groups are obtained, for example at regular time intervals or at random time intervals, which are stored. A larger number of intensity measurements can be considered in the transponder module in order to be able to determine precisely the crossing time by reconstruction of the magnetic or electromagnetic field curve in said transponder module.

Figure 3:
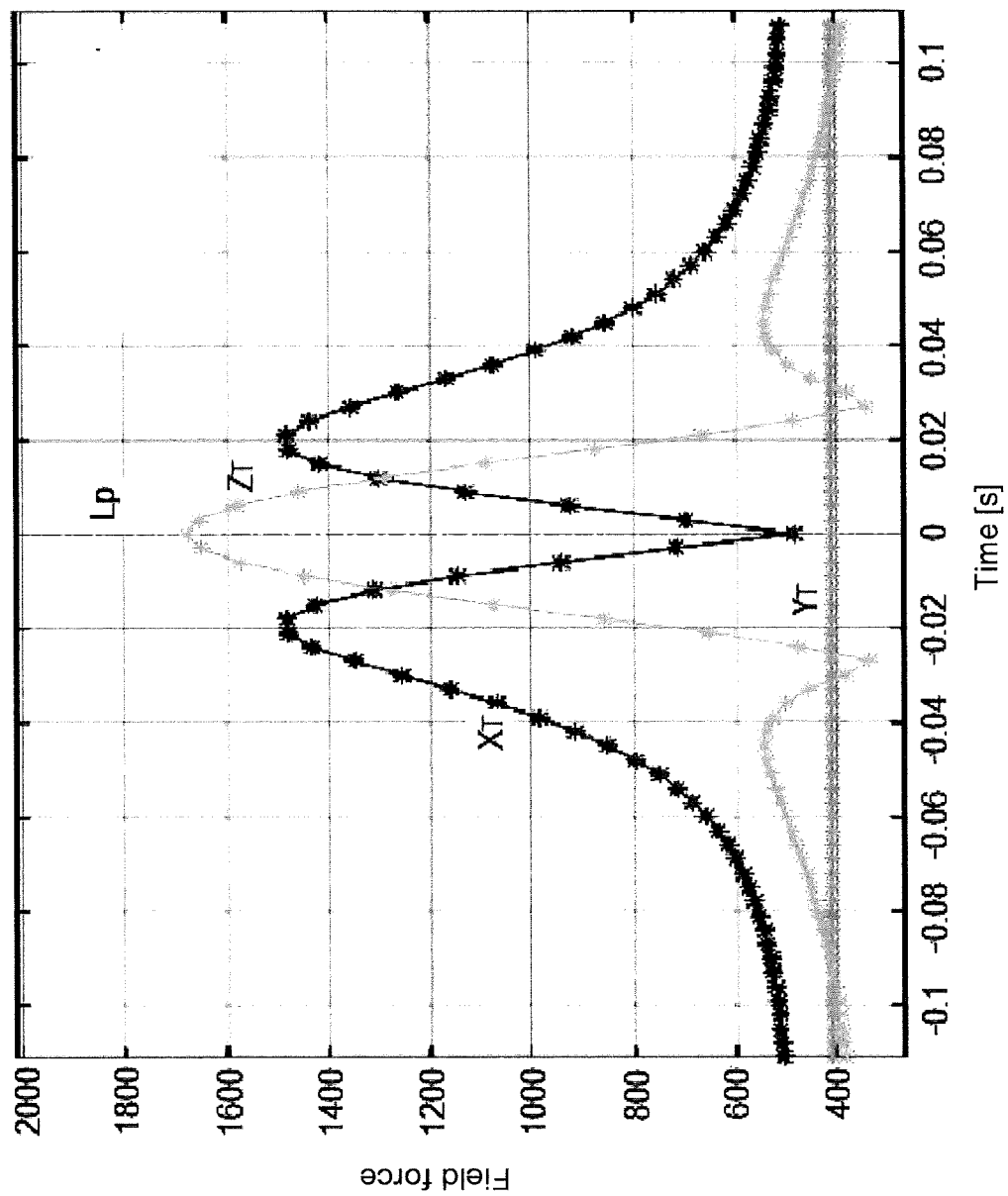
FIG. 3 represents a graph of the shape of the magnetic field measured according to the three spatial directions during crossing of the line of passage.

By way of illustration, FIG. 3 represents a graph of the shape of the magnetic field measured along the three spatial directions X, Y, Z during crossing of the line of passage Lp. As a function of the orientation of the transponder module, for example as shown in FIG. 3, the X axis is the direction of movement of the transponder module and gives the curve $X_T$, the axis Z defines the vertical direction whilst giving the curve $Z_T$, and the axis Y gives the curve $Y_T$. Several measurement points of the electromagnetic field can be measured upon activation of the transponder module 10 of FIG. 2. These various measurement points along the three axes are stored in the memory 122 of the microcontroller 12. A reconstruction of the curve of the magnetic field can be calculated in the microcontroller 12 in order to determine precisely the crossing time in the transponder module 10 according to the time base 121 of the microcontroller 12.

The transponder module 10 has a dedicated algorithm or microprogram in the microcontroller 12 in order to determine the precise crossing time of the line of passage. This determination of the precise time is effected directly in the integrated circuit of the transponder module 10 by using the dedicated microprogram. For this determination of the time, once the time base 121 thereof is activated, the transponder module analyses the measured curve of the electromagnetic field on the basis of several intensity measurement points. This makes it possible for it to determine precisely the crossing time in order to send the result of this determination to the decoder unit via a UHF communication. The evaluation value of the time of the activated time base of the transponder module can also be sent with the crossing time. This allows the decoder unit to determine precisely the exact crossing time after temporal conversion.

The UHF communication for transmitting the results to the decoder unit can use one or more UHF channels by using frequency hopping. Frequency hopping can be according to a hopping diagram which is fixed or established randomly. The transmission can be synchronised in time by the frame of the LF wake-up field, or can occur at random intervals using the Aloha protocol. In order to avoid collisions with messages from other transponder modules 10, it uses the method "Listen Before Talk" LBT according to any configuration. The transponder module 10 repeats a transmitted result until it receives confirmation from the decoder unit using a UHF return channel (uplink) or until it reaches a dead time or an interruption.

According to FIGS. 1 and 2, the transponder module 10 therefore contains its own time base 121 and generates the result of determination of a crossing time relative to this time base. As indicated previously, with each message, it can send, to the decoder unit 4, also the current value of the time base thereof. The decoder unit 4 assigns or attributes, to each message received from the transponder module, a temporal stamp. This temporal stamp is preferably synchronised to the time of day. By using a temporal stamp, the current value of the time base of the transponder module 10 and the result transmitted by the transponder module, the decoder unit 4 can calculate the precise crossing time relative to its own time base.

For each crossing, the activated transponder module 10 can send three messages. A first message as a first contact after wake-up, a second message as a prediction of the exact crossing before the actual crossing of the line of passage 6 according to the result of the detection algorithm, and a third message with the exact crossing time which is also a result of the detection algorithm. The first contact message is used in order to identify a transponder module 10 which is activated and near the line of passage 6. Prediction of the crossing can be used in order to stop a current time on a display panel or on a television such that it never comes back once the exact time of the crossing is known. The last or third message with the exact crossing time is generated from 50 to 100 ms after the actual crossing of the line of passage. This last message is used in order to determine a final ranking or as an input for a photofinish camera in order to obtain the result more rapidly.

It should be noted that algorithms for detecting the crossing time can change for various reasons, for example as a function of the orientations of the various antennae which are used, of the movements of the transponder module passing the antenna. For this reason, it is essential that the microprogram of the transponder module 10 which contains such algorithms, is updated in a simple manner. Even having this algorithm in several transponder modules, sometimes more than 100 transponder modules, it is possible that the decoder unit 4 allows updating of the microprogram of each transponder module 10 using the same UHF link as the latter which is used to take into account receipt of the results. Booting-up software in the decoder unit 4 can be provided for updating the microprogram of each transponder module. Thus an unlimited set of transponder modules 10 can be updated simultaneously. In principle, this updating of the microprogram or dedicated algorithm of each module can be effected before the start of the sports competition.

In order to update the microprogram, the decoder unit 4 or possibly a dedicated updating device for transponder modules 10 sends, after receipt of a first contact message, a special unblocking command using the return channel (uplink). Then, it repeats transmission of the entire microprogram several times, and after each transmission of the microprogram, each transponder module 10 responds. Once the transponder module 10 is unblocked for updating, confirmation of receipt of the complete microprogram at the decoder unit 4 or at the updating device stops transmission of the microprogram.

It should be noted also that, instead of transmitting the results to the decoder unit 4 of FIG. 1 using a proprietory UHF communication, the transponder module 10 can also be connected to a sensor network using any standard broadband technology, for example UMTS/HSPA (3G), LoRa (LP-WAN), or others, as are used in IoT applications (internet of things). In such a solution, the transponder module 10 must be synchronised on the network in order to send the results directly with a temporal stamp which is synchronised relative to the local time of day or UTC. The synchronisation can occur at the moment of wake-up of the transponder module 10 by the electromagnetic field signal transmitted via the antenna 3 of FIG. 1 with a synchronisation modulation relative to the time base of the decoder unit 4. This modulation in the wake-up signal at 125 kHz can be effected via an all or nothing modulation (ON-OFF Keying).

For this modulation of the wake-up electromagnetic field signal, an identification code of the antenna can also be modulated in order to define which antenna is providing the electromagnetic field signal for the transponder module detecting it. After transmission of the wake-up commands, synchronisation and subsequently transmission of data, the generated LF electromagnetic field signal no longer varies in frequency and in amplitude in order to allow measurement of the intensity of the electromagnetic field by each activated transponder module.

As indicated previously, the time base 121 in the microcontroller 12 of the transponder module 10 of FIG. 2 can be synchronised, once woken up, to the time base of the decoder unit in order to provide a precise crossing time transmitted by the transponder module. This synchronisation can be transmitted by a modulation of the all or nothing type in the low-frequency electromagnetic field signal LF.

An explanation is also given below in order to understand clearly the manner of determining the precise crossing time on the line of passage 6 by means of measurements effected in the transponder module 10. It should be noted first of all that it is not necessary to transmit the current time of the race to the transponder module 10 for determination of a crossing time in said module. The measuring system 1 is designed so that it can operate without a return communication (uplink) from the decoder unit 4 to the transponder module 10.

Each transponder module 10 has its own time base 121 which begins to count from wake-up of the transponder module. The algorithm in the transponder module 10 calculates the crossing time relative to its own time base 121. When it transmits the result to the decoder unit 4, it transmits the crossing time Tp plus the value of the counting time of the activated time base thereof, when it sends the message Ts. Transmission of the message takes a known fixed time Tv which is the flight time of the UHF signal from the transponder module 10 to the decoder unit 4. The decoder unit 4 assigns or attributes a temporal stamp which is synchronised to the time of day Trt to each received message. Thus it can convert the temporal stamp of the transponder module 10 to a temporal stamp of the time of day Tpt according to the following formula:

$$Tpt=Trt-Tv-(Ts-Tp)=Trt-Tv-Ts+Tp$$

The advantage of this time measuring system is that it can operate with a radio communication in a single direction from the transponder module 10 to the decoder unit 4.

In a numbered example for understanding the functioning, the transponder module 10 wakes up and the time base thereof begins at 0 s. For example 600 ms later, it crosses the finish line. Approx. 50 ms later, the algorithm analysing the curve detects that the line of passage has been crossed and calculates, on the basis of all the data, which were taken since wake-up of the transponder module 10, the crossing time via the time base of the transponder module 10. This means that it calculates the crossing time for example at 599 ms.

After that, the transponder module 10 sends the message of the result of the determined crossing time with the crossing time Tp equal to 599 ms and the transmission time Ts equal to 650 ms. The decoder unit 4 receives this message for example at 14 h 1 min 32 s, with the UHF transmission time or flight time Tv which is 2 ms. According to the following calculation, this gives:

$$Tpt = Trt - Tv - Ts + Tp = 14 \text{ h } 1 \text{ min } 32 \text{ s} - 2 \text{ ms} - 650 \text{ ms} + 599 \text{ ms} =$$
$$14 \text{ h } 1 \text{ min } 31 \text{ s } 947 \text{ ms}$$

In order to be sure that the information is received by the decoder unit 4, the transponder module 10 repeats the result 14 ms later, and it sends:

Tp equal to 599 ms (the same for the same crossing) and Ts equal to 664 ms (changed because 14 ms later).

The decoder receives this message at 14 h 1 min 32 s 14 ms and calculates:

$$Tpt=Trt-Tv-Ts+Tp=14 \text{ h1 min } 32 \text{ s14 ms}-2 \text{ ms}-664 \text{ ms}+599 \text{ ms}=14 \text{ h1 min } 31 \text{ s}947 \text{ ms}$$

This corresponds to the same result as previously, hence the decoder unit 4 knows that this is redundant information.

The result calculated in the transponder module 10 is generally transmitted with repetition until the decoder unit 4 tells it to stop via a return communication (uplink) or when an interruption occurs.

It should be noted that, according to a variant of the measuring system of a crossing time, the transponder module 10 can likewise transmit only the time since the crossing Tsp, which is equal to Ts−Tp instead of two separate items of information. The calculation in the decoder unit 4 would consequently become:

$$Tpt=Trt-Tv-Ts-Tsp$$

With this, the advantage is that less information need be transmitted from the transponder module 10 to the decoder unit 4. The electrical consumption of the transponder module is therefore greatly reduced relative to the functioning of measuring systems of the state of the art.

For the method for determination of a crossing time, the transponder module 10 must firstly be woken up by detection of the low-frequency LF electromagnetic field of the antenna 3 of FIG. 1. Then the activated transponder module 10 can measure several successive intensities of the captured electromagnetic field in order to reconstruct the curve of the electromagnetic or magnetic field directly in the transponder module. In this way, it can determine the crossing time directly. This crossing time is determined as a function of the time base of the transponder module. The result of the calculation of this crossing time is subsequently transmitted by the transponder module to the decoder unit 4 of the measuring system 1. There is likewise transmitted by the transponder module in the same message, the value of the time base of the transponder module 10 which can be synchronised at the moment of wake-up. A temporal adaptation is effected in the decoder unit 4 in order to determine precisely and easily the exact crossing time following a message received from the transponder module.

From the description which has just been given, several variants of the transponder module, of the system and of the method for determination of at least one crossing time of a line of passage in a sports competition can be imagined by the person skilled in the art without departing from the scope of the invention defined by the claims. It can also be imagined that the transponder module is activated before detection of the signal of the low-frequency electromagnetic field.

What is claimed is:

1. A measuring system for measuring a crossing time, comprising:
   a low-frequency transmitter configured to transmit a low-frequency electromagnetic field signal via a transmission antenna disposed at a level of a line of passage;
   a decoder configured to receive at least one measurement signal from each transponder module of at least one transponder module when the transponder module is near the line of passage; and
   the at least one transponder module, each being carried by a corresponding moving object and comprising:
      a low-frequency signal receiver configured to receive the electromagnetic field signal via a receiving antenna, each of the at least one transponder module being woken up when said low-frequency electromagnetic field signal is received,
      a microcontroller configured to receive a receipt signal from the low-frequency signal receiver,
      a transmitter linked to the microcontroller and configured to transmit, via a high-frequency antenna, at least one measurement result in a high-frequency measurement signal,
      a time base in the microcontroller, the time base not being synchronized with the decoder and being activated to begin measurement of a local time upon receipt of the low-frequency electromagnetic field signal,
   wherein, after receiving the receipt signal, the microcontroller of each transponder module of the at least one transponder module is configured to,
      measure and store several successive intensities of the electromagnetic field signal in order to reconstruct an electromagnetic field curve,
      calculate a crossing time of the transponder module in units of the local time measured by the activated time base, based on the reconstructed electromagnetic field curve, and
      transmit, to the decoder, a transmission time together with the calculated crossing time, the transmission time being equal to a value of the local time measured by the time base of the transponder module when the crossing time and the transmission time are transmitted, and
   wherein the decoder is configured to receive the crossing time at a receiving time, and convert the received crossing time in the units of the local time measured by the time base into a time of day, based on the receiving time, the transmission time, and the received crossing time.

2. The measuring system according to claim 1, wherein the decoder is further configured to transmit, via the high-frequency antenna, a UHF signal for updating a dedicated algorithm or microprogram, and
   wherein the UHF signal is received by a high-frequency antenna of each of the at least one transponder module.

3. The measuring system according to claim 1, wherein the decoder is further configured to transmit confirmation of receipt of the crossing time, via a UHF channel to a high-frequency antenna of each of the at least one transponder module.

4. The measuring system according to claim 3, wherein the decoder is further configured to transmit an interruption signal in order to place each transponder module of the at least one transponder module in a rest mode, after receipt of the crossing time from the transponder module.

5. The measuring system according to claim 1, wherein the at least one transponder module and the decoder are provided in order to effect a UHF communication by using frequency hopping for the transmission of the crossing time or for repetition of the crossing time transmitted from the at least one transponder module.

6. The measuring system of claim 1, wherein the decoder is further configured to record the receiving time when receiving the crossing time, and convert the crossing time into the time of day based on the recorded receiving time.

7. A method for measurement in a measuring system, the method comprising:
   receiving an electromagnetic field signal transmitted by a transmitter of the measuring system;
   activating a transponder module upon receipt of the electromagnetic field signal before crossing a line of passage;
   in response to the activating, begin measurement of a local time by a time base that is not synchronized with a decoder of the measuring system;

measuring several intensities of the electromagnetic field signal by the transponder module, after the transponder module is activated;

calculating, by reconstruction of a curve of the electromagnetic field, a crossing time of the transponder module of the line of passage, in units of the local time measured by the time base;

transmitting, to the decoder of the measuring system, a transmission time together with the calculated crossing time, the transmission time being equal to a value of the local time measured by the time base of the transponder module when the crossing time and the transmission time are transmitted; and converting, by the decoder, the received crossing time in the units of the local time measured by the time base into a time of day, based on a receiving time, the transmission time, and the received crossing time.

8. The method for measurement according to claim 7, wherein the transponder module is configured to send a first message to the decoder as a first contact after wake-up, a second message as a prediction of a predicted crossing time just before an actual crossing of the line of passage, and a third message with the crossing time calculated by the microcontroller in the transponder module.

9. The method for measurement according to claim 8, wherein the predicted crossing time is used by the decoder to stop a display of a race time on a display, and to prevent the race time from being displayed again once the calculated crossing time is known.

10. The method for measurement according to claim 8, further comprising transmitting, by the transponder module, several times at regular or random temporal intervals, the calculated crossing time along with the measured local time measured by the time base of the transponder module until the transponder receives, via a UHF channel, a confirmation of receipt from the decoder.

11. The method for measurement according to claim 8, wherein the decoder is configured to transmit, via a UHF channel, to the transponder module, a signal for updating a dedicated algorithm or microprogram, the dedicated algorithm or microprogram being used by the microcontroller to calculate the crossing time of the transponder module.

* * * * *